US009066263B2

(12) United States Patent
Jung et al.

(10) Patent No.: US 9,066,263 B2
(45) Date of Patent: Jun. 23, 2015

(54) METHOD AND APPARATUS FOR COORDINATING INTER-CELL INTERFERENCE

(75) Inventors: Sung Hoon Jung, Anyang-si (KR); Seung June Yi, Anyang-si (KR); Young Dae Lee, Anyang-si (KR); Sung Duck Chun, Anyang-si (KR); Sung Jun Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 207 days.

(21) Appl. No.: 13/882,722

(22) PCT Filed: Nov. 1, 2011

(86) PCT No.: PCT/KR2011/008240
§ 371 (c)(1),
(2), (4) Date: Apr. 30, 2013

(87) PCT Pub. No.: WO2012/060602
PCT Pub. Date: May 10, 2012

(65) Prior Publication Data
US 2013/0215785 A1 Aug. 22, 2013

Related U.S. Application Data

(60) Provisional application No. 61/409,072, filed on Nov. 1, 2010.

(51) Int. Cl.
*H04W 80/04* (2009.01)
*H04W 88/06* (2009.01)
*H04W 28/04* (2009.01)
*H04W 72/04* (2009.01)
*H04L 12/801* (2013.01)
*H04L 12/26* (2006.01)
*H04W 24/10* (2009.01)
*H04J 11/00* (2006.01)
*H04W 72/08* (2009.01)
*H04W 24/02* (2009.01)

(52) U.S. Cl.
CPC ............. *H04W 24/10* (2013.01); *H04J 11/005* (2013.01); *H04W 24/02* (2013.01); *H04W 72/082* (2013.01); *H04J 2211/001* (2013.01)

(58) Field of Classification Search
CPC ....... H04L 47/10; H04L 43/50; H04W 80/04; H04W 88/06; H04W 28/04; H04W 72/04
USPC ........................................ 370/252, 328, 329
See application file for complete search history.

(56) References Cited

PUBLICATIONS

Samsung, "Support of time domain ICIC in Rel-10," R1-105406, 3GPP TSG RAN WG1 Meeting #62bis, Oct. 2010, 4 pages.
Nokia Siemens Networks, et al., "TDM eICIC coordination between macro eNBs and CSG Home eNBs," R1-105551, 3GPP TSG RAN WG1 #62-bis Meeting, Oct. 2010, 6 pages.
LG Electronics, "Details of eICIC in Macro-Pico case," R1-105352, 3GPP TSG RAN WG1 Meeting #62bis, Oct. 2010, 4 pages.
Motorola, "Discussion of time domain eICIC scheme for Rel-10," R1-105622, 3GPP TSG RAN WG1 Meeting #62bis, Oct. 2010, 6 pages.

*Primary Examiner* — Ronald B Abelson
(74) *Attorney, Agent, or Firm* — Lee, Hong, Degerman, Kang & Waimey (57) ABSTRACT

Provided are a method and an apparatus for coordinating inter-cell interference. A user equipment receives from a serving cell information on a downlink timing offset between an interfering cell and an interfered cell and a limited resource measurement, and applies the downlink timing offset to perform measurement using a radio resource indicated for the limited resource measurement, thereby allowing the user equipment to be provided services through the radio resource which substantially mitigates interference, and enhancing connectivity with a network.

11 Claims, 10 Drawing Sheets

METHOD AND APPARATUS FOR COORDINATING INTER-CELL INTERFERENCE

CROSS-REFERENCE TO RELATED APPLICATIONS

This application is the National Stage filing under 35 U.S.C. 371 of International Application No. PCT/KR2011/008240, filed on Nov. 1, 2011, which claims the benefit of U.S. Provisional Application Ser. No. 61/409,072, filed on Nov. 1, 2010, the contents of which are all hereby incorporated by reference herein in their entirety.

BACKGROUND OF THE INVENTION

1. Field of the invention

The present invention relates to wireless communication and, more particularly, to a method and apparatus for coordinating inter-cell interference in a wireless communication system.

2. Related Art

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

Inter-cell Interference Coordination (ICIC) is an operation of managing radio resources so that control of inter-cell interference can be maintained. ICIC mechanism can be divided into frequency domain ICIC and time domain ICIC. ICIC includes multiple cell RRM (Radio Resource Management) function which requires considering of information from multiple cells.

Frequency domain ICIC coordinates the use of frequency domain resources (e.g., RB (resource block)) among multiple cells. Time domain ICIC coordinates time domain resources (e.g., subframes) among multiple cells.

In ICIC, interference the object causing interference (i.e., interfering cell) and the object inflicted by the interference (i.e., interfered cell) are determined depending on the object of measurement by the terminal In many networks, depending on the methods of manipulating networks, downlink transmissions between the serving cell and neighbor cells are not exactly synchronized in time domain. However, in order for the serving cell to apply ICIC mechanism considering the interference which neighbor cells affect to the terminal, it is necessary to know exactly the difference between the downlink timing of neighbor cells and the downlink timing of the serving cell.

The downlink timing of the serving cell and neighbor cells experienced by the terminal can be different depending on the location of the terminal or surrounding environments.

Therefore, ICIC taking consideration of the difference in downlink timing of multiple cells is needed.

SUMMARY OF THE INVENTION

The present invention provides a method and apparatus for inter-cell interference coordination considering a downlink timing offset among cells.

The present invention also provides a method and apparatus for reporting a downlink timing offset among cells.

In an aspect, a method for coordinating inter-cell interference in a wireless communication system is provided. The method includes receiving, by a user equipment, information on a downlink timing offset between an interfering cell and an interfered cell and a measurement resource restriction from a serving cell, and performing, by the user equipment, a measurement by using a radio resource indicated by the measurement resource restriction by applying the downlink timing offset.

The radio resource indicated by the measurement resource restriction may include at least one almost blank subframe (ABS) that includes a subframe having a reduced transmission power or zero transmission power on a physical channel due to the interfering cell.

The method may further include determining, by the user equipment, a reference point of the at least one ABS based on the downlink timing offset.

The serving cell may include a macro cell, and the interfering cell may include a closed subscriber group (CSG) cell, and the user equipment may not be a member of the interfering cell.

The serving cell may include a pico cell, and the interfering cell may include a macro cell whose coverage is overlapped partly or entirely with the pico cell.

In another aspect, a user equipment configured for coordinating inter-cell interference in a wireless communication system is provided. The user equipment includes a radio frequency (RF) unit configured to transmit radio signals, and a processor operably connected to the RF unit and configured to receive information on a downlink timing offset between an interfering cell and an interfered cell and a measurement resource restriction from a serving cell and perform a measurement by using a radio resource indicated by the measurement resource restriction by applying the downlink timing offset.

In another aspect, a method for reporting a downlink timing in a wireless communication system is provided. The method includes determining, by a user equipment, the downlink timing offset between an interfering cell and an interfered cell from a serving cell, and reporting, by the user equipment, said downlink timing offset to the serving cell.

A user equipment can be provided services through radio resources in which interference is substantially mitigated and connectivity with networks can be improved.

DESCRIPTION OF EXEMPLARY EMBODIMENTS

Figure 1:
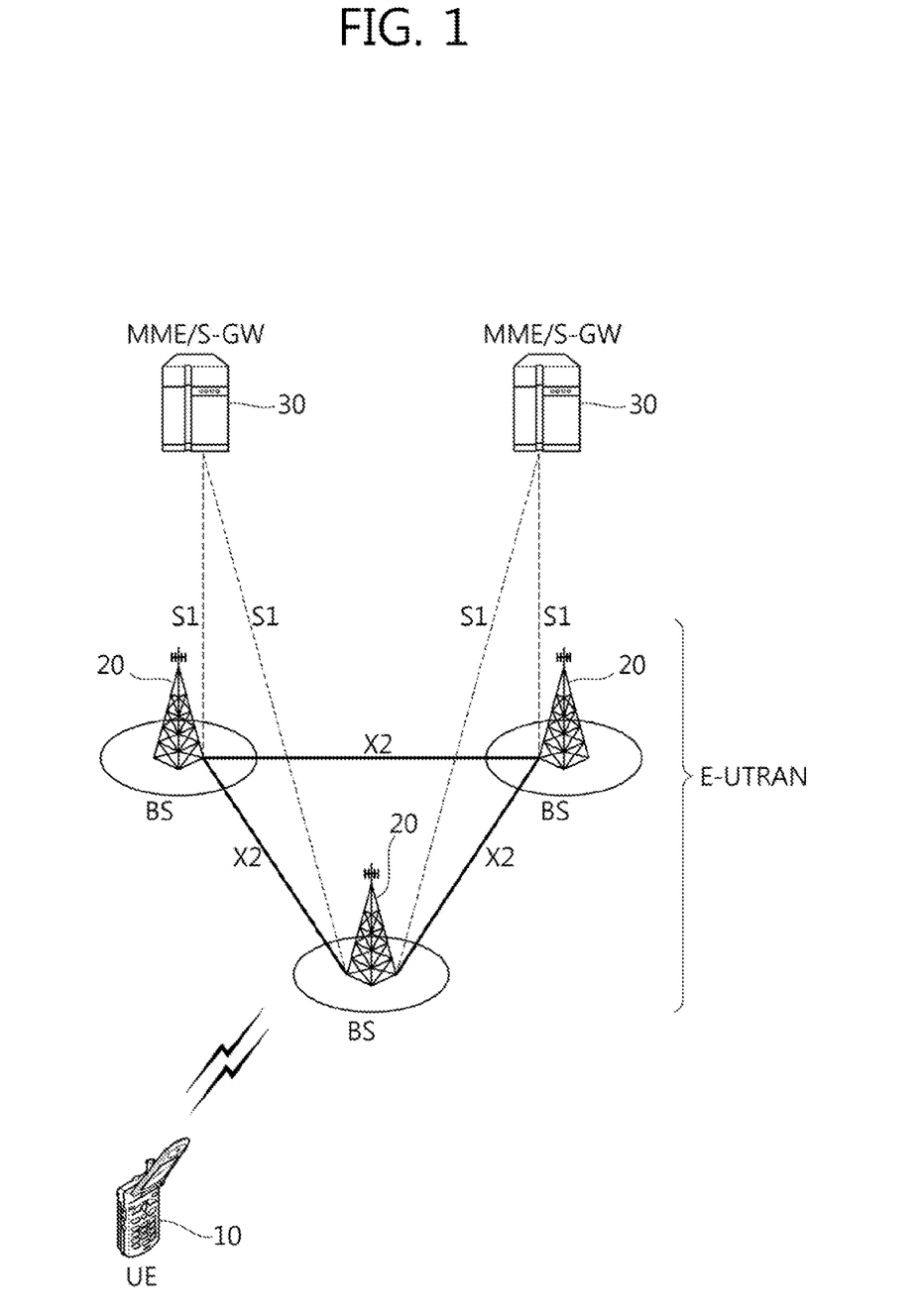
FIG. 1 illustrates a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
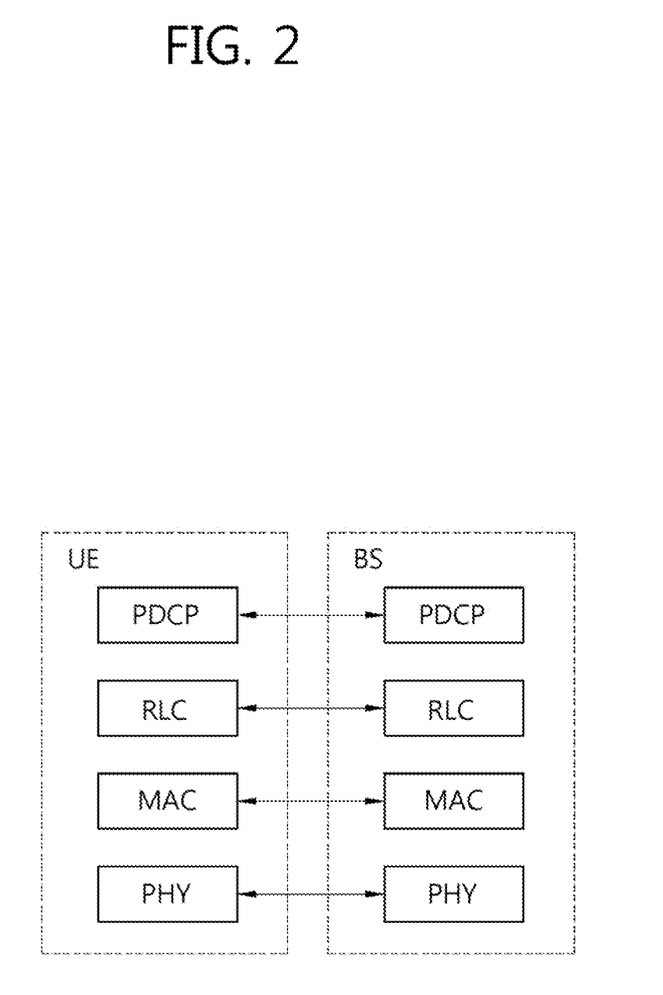
FIG. 2 is a block diagram showing the structure of a wireless protocol on the user plane.
Figure 3:
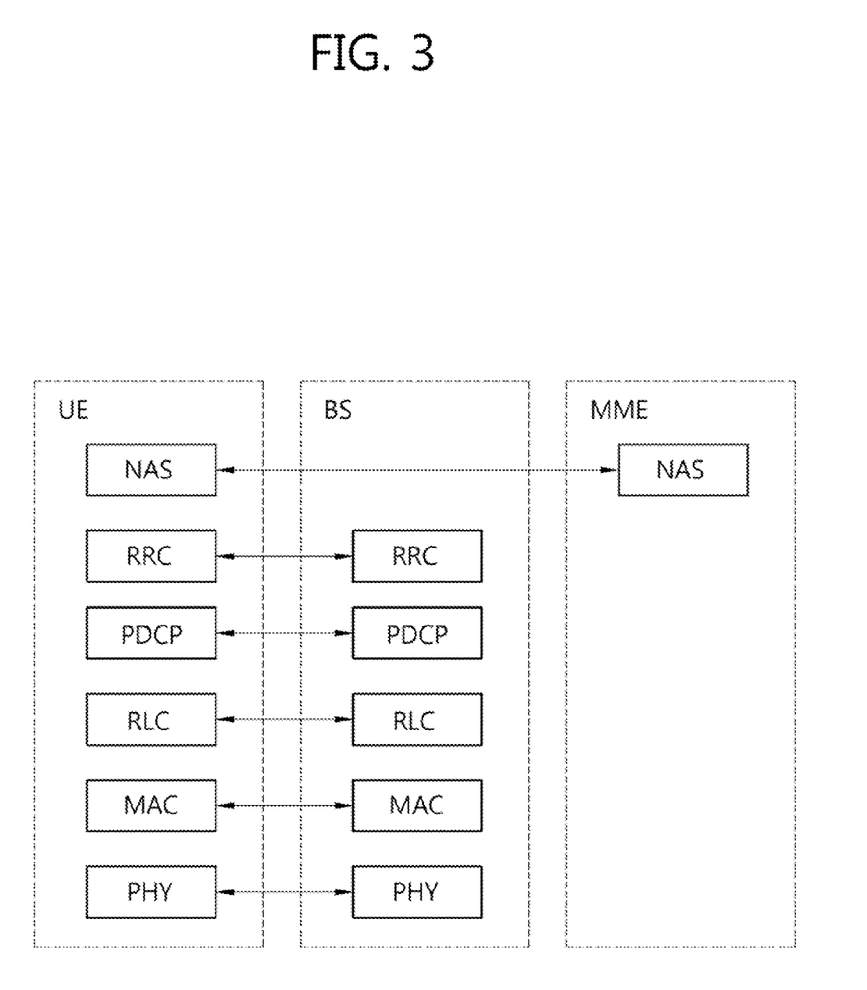
FIG. 3 is a block diagram showing the structure of a wireless protocol on the control plane.

FIG. 2 is a diagram showing a radio protocol architecture for a user plane. FIG. 3 is a diagram showing a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Between different PHY layers, i.e., a PHY layer of a transmitter and a PHY layer of a receiver, data is transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/demultiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (also may be referred as an RRC connected mode), and otherwise the UE is in an RRC idle state (also may be referred as an RRC idle mode).

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several subcarriers in a frequency domain. One subframe includes a plurality of OFDM symbols in the time domain. A resource block is a resource allocation unit, and includes a plurality of OFDM symbols and a plurality of subcarriers. Further, each subframe may use particular subcarriers of particular OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Hereinafter, an RRC state of a UE and an RRC connection mechanism will be described.

The RRC state indicates whether an RRC layer of the UE is logically connected to an RRC layer of an E-UTRAN. If the two layers are connected to each other, it is called an RRC connected state, and if the two layers are not connected to each other, it is called an RRC idle state. When in the RRC connected state, the UE has an RRC connection and thus the E-UTRAN can recognize a presence of the UE in a cell unit. Accordingly, the UE can be effectively controlled. On the other hand, when in the RRC idle state, the UE cannot be recognized by the E-UTRAN, and is managed by a core network in a tracking area unit which is a unit of a wider area than a cell. That is, regarding the UE in the RRC idle state, only a presence or absence of the UE is recognized in a wide area unit. To get a typical mobile communication service such as voice or data, a transition to the RRC connected state is necessary.

When a user initially powers on the UE, the UE first searches for a proper cell and thereafter stays in the RRC idle state in the cell. Only when there is a need to establish an RRC connection, the UE staying in the RRC idle state establishes the RRC connection with the E-UTRAN through an RRC connection procedure and then transitions to the RRC connected state. Examples of a case where the UE in the RRC idle state needs to establish the RRC connection are various, such as a case where uplink data transmission is necessary due to telephony attempt of the user or the like or a case where a response message is transmitted in response to a paging message received from the E-UTRAN.

A non-access stratum (NAS) layer belongs to an upper layer of the RRC layer and serves to perform session management, mobility management, or the like.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a process of registering to the network through an initial attach procedure. If the attach procedure is successfully performed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When the UE in the ECM-IDLE state establishes an RRC connection with the E-UTRAN, the UE enters the ECM-CONNECTED state. When the MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Next, system information will be described.

The system information includes essential information that must be known to a UE to access a BS. Thus, the UE has to receive all of the system information before accessing the BS. Further, the UE must always have the latest system information. Since the system information is information that must be known to all UEs in one cell, the BS periodically transmits the system information.

According to the section 5.2.2 of 3GPP TS 36.331 V8.7.0 (2009-09) "Radio Resource Control (RRC); Protocol specification (Release 8)", the system information is classified into a master information block (MIB), a scheduled block (SB), and a system information block (SIB). The MIB allows the UE to know a physical configuration (e.g., bandwidth) of a particular cell. The SB reports transmission information (e.g., a transmission period or the like) of SIBs. The SIB is a group of a plurality of pieces of system information related to each other. For example, an SIB includes only information of a neighbor cell, and another SIB includes only information of an uplink radio channel used by the UE.

In general, a service provided by the network to the UE can be classified into three types to be described below. Further, according to which service can be provided, the UE recognizes a cell type differently. A service type will be first described below, and then the cell type will be described.

1) Limited service: This service provides an emergency call and an earthquake and tsunami warning system (ETWS), and can be provided in an acceptable cell.

2) Normal service: This service denotes a public use service for general use, and can be provided in a suitable or normal cell.

3) Operator service: This service denotes a service for a network service provider, and a cell can be used only by the network service provider and cannot be used by a normal user.

The service type provided by a cell can be classified as follows.

1) Acceptable cell: This cell serves a UE with a limited service. This cell is not barred from the perspective of the UE, and satisfies a cell selection criterion of the UE.

2) Suitable cell: This cell serves a UE with a regular service. This cell satisfies a condition of the acceptable cell, and also satisfies additional conditions. Regarding the additional conditions, this cell has to belong to a PLMN to which the UE can access, and a tracking area update procedure of the UE must not be barred in this cell. If the corresponding cell is a CSG cell, this cell must be accessible by the UE as a CSG member.

3) Barred cell: Information indicating that a cell is a barred cell is broadcast in this cell by using the system information.

4) Reserved cell: Information indicating that a cell is a reserved cell is broadcast in this cell by using the system information.

Next, procedures for measurements and measurement reports will be described in detail.

It is necessary for a wireless communication system to support mobility of a UE. Therefore, the UE persistently measures quality of a serving cell providing a current service and quality of a neighbor cell. The UE reports a measurement result to a network at a proper time. The network provides optimal mobility to the UE by using a handover or the like.

To provide information which can be helpful for a network operation of a service provider in addition to the purpose of supporting the mobility, the UE may perform measurement with a specific purpose determined by the network, and may report the measurement result to the network. For example, the UE receives broadcast information of a specific cell determined by the network. The UE may report to a serving cell a cell identify (e.g., a global cell identity) of the specific cell, location identification information indicating a location of the specific cell (e.g., a tracking area code), and/or other cell information (e.g., whether it is a member of a closed subscriber group (CSG) cell).

While moving, if the UE determines that quality of a specific region is significantly poor, the UE may report a measurement result and location information on the poor cell to the network. The network may attempt to optimize the network on the basis of the measurement result reported from UEs which assist the network operation.

In a wireless communication system having a frequency reuse factor of 1, mobility is generally supported between different cells existing in the same frequency band. Therefore, in order to properly guarantee the UE mobility, the UE has to properly measure cell information and quality of neighbor cells having the same center frequency as a center frequency of a serving cell. Measurement on a cell having the same center frequency as the center frequency of the serving cell is referred to as intra-frequency measurement. The UE performs the intra-frequency measurement and reports a measurement result to the network, so as to achieve the purpose of the measurement result.

Service providers may operate networks by using a plurality of frequency bands. If a service of a communication system is provided by using the plurality of frequency bands, optimal mobility can be guaranteed to the UE when the UE is able to properly measure cell information and quality of neighbor cells having a different center frequency from the center frequency of the serving cell. Measurement on a cell having the different center frequency from the center frequency of the serving cell is referred to as inter-frequency measurement. The UE has to be able to perform the inter-frequency measurement and report a measurement result to the network.

When the UE supports measurement on a heterogeneous network, measurement on a cell of the heterogeneous network may be performed according to a configuration of a BS. Such a measurement on the heterogeneous network is referred to as inter-radio access technology (RAT) measurement. For example, RAT may include a GMS EDGE radio access network (GERAN) and a UMTS terrestrial radio access network (UTRAN) conforming to the 3GPP standard, and may also include a CDMA 200 system conforming to the 3GPP2 standard.

Hereinafter, by referring to the 3GPP TS 36.304 V8.8.0 (2009-12) "User Equipment (UE) procedures in idle mode (Release 8)", a method and procedure for selecting a cell by a UE will be described in detail.

After a UE selects a certain cell through a cell selection process, the signal strength and quality between the UE and the BS may be changed due to the change of the UE mobility and wireless environment. Therefore, if the quality of the selected cell deteriorates, the UE may select another cell providing better quality. If a cell is reselected in this manner, a cell providing signal quality better than that of the currently selected cell is selected in general. This process is called cell reselection. A basic object of the cell reselection process is generally to select a cell providing best quality to the UE from the perspective of the radio signal quality.

In addition to the perspective of the radio signal quality, the network may notify the UE of a priority determined for each frequency. The UE that has received the priority may consider this priority in the first place than the radio signal quality criteria during the cell reselection process.

As described above, there is a method of selecting or reselecting a cell based on the signal property of the wireless environment. When a cell is selected for reselection in the cell reselection process, there may be cell reselection methods as described below, based on the RAT and frequency characteristics of the cell.

Intra-frequency cell reselection: A reselected cell is a cell having the same center-frequency and the same RAT as those used in a cell on which the UE is currently being camped.

Inter-frequency cell reselection: A reselected cell is a cell having the same RAT and a different center-frequency with respect to those used in the cell on which the UE is currently being camped.

Inter-RAT cell reselection: A reselected cell is a cell using a different RAT from a RAT used in the cell on which the UE is currently being camped.

The steps for cell reselection are as follows.

First, A UE receives from a BS parameters for cell reselection.

Second, the UE measures quality of a serving cell and a neighbor cell for cell reselection.

Third, the cell reselection is performed based on cell reselection criteria. The cell reselection criteria have following characteristics with regard to the measurement of serving cells and neighbor cells.

The intra-frequency cell reselection is basically based on ranking. The ranking is an operation for defining a criterion value for evaluation of cell reselection and for ordering cells according to a magnitude of the criterion value by using the criterion value. A cell having the highest criterion is referred to as a best-ranked cell. The cell criterion value is a value to which a frequency offset or a cell offset is optionally applied on the basis of a value measured by the UE for a corresponding cell.

The inter-frequency cell reselection is based on a frequency priority provided by the network. The UE attempts to camp on at a frequency having a top priority. The network may provide the same frequency priority to be commonly applied to UEs in a cell by using broadcast signaling or may provide a frequency-specific priority to each UE by using dedicated signaling for each UE.

For the inter-frequency cell reselection, the network may provide parameters (e.g., frequency-specific offsets) for use in cell reselection to the UE for each frequency.

For the intra-frequency cell reselection or the inter-frequency cell reselection, the network may provide a neighbor cell list (NCL) for use in the cell reselection to the UE. The NCL includes cell-specific parameters (e.g., cell-specific offsets) used in the cell reselection.

For the intra-frequency or inter-frequency cell reselection, the network may provide the UE with a black list, i.e., a list of cells not to be selected in the cell reselection. The UE does not perform the cell reselection on cells included in the black list.

Now, the ranking used in a cell reselection evaluation process will be described.

A ranking criterion used to assign a priority to a cell is defined by Equation 1 as shown:

$$Rs = Qmeas,s + Qhyst, \quad Rn = Qmeas,n - Qoffset \quad \text{[Equation 1]}$$

where Rs denotes a ranking value of a serving cell, Rn denotes a ranking criterion of a neighbor cell, Qmeas,s denotes a quality value measured for the serving cell by the UE, Qmeas,n denotes a quality value measured for the neighbor cell by the UE, Qhyst denotes a hysteresis value for ranking, and Qoffset denotes an offset between two cells.

In the intra-frequency cell reselection, if the UE receives an offset Qoffsets,n between the serving cell and the neighbor cell, Qffoset=Qoffsets,n. Otherwise, Qffoset=0.

In the inter-frequency cell reselection, if the UE receives the offset Qoffsets,n, Qoffset=Qoffsets,n+Qfrequency. Otherwise, Qoffset=Qfrequency.

If the ranking criterion Rs of the serving cell and the ranging criterion Rn of the neighbor cell are not much different from each other and constantly vary, ranking orders of the serving cell and the neighbor cell may change frequently. Thus, the serving cell and the neighbor cell may be reselected alternately while changing their ranking orders too often. In order to prevent the UE from reselecting two cells alternately, the hysteresis value Qhyst is used to give a hysteresis in the cell reselection.

The UE measures the ranking criterion Rs of the serving cell and the ranking criterion Rn of the neighbor cell according to the above equation. A cell having the greatest ranking criterion value is reselected by considering this cell as a best-ranked cell.

In the above-mentioned cell reselection criterion, the quality of cells is considered as most important factor when performing the cell reselection. If a reselected cell is not a suitable cell, the UE excludes the reselected cell or a frequency of the reselected cell from targets of the cell reselection.

Now Inter-cell Interference Coordination (ICIC) will be described.

ICIC is an operation of managing radio resources so that control of inter-cell interference can be maintained. ICIC mechanism can be divided into frequency domain ICIC and time domain ICIC. ICIC includes multiple cell Radio Resource Management (RRM) function which requires considering of information from multiple cells.

An interfering cell is a cell providing interference. The interfering cell may be called an aggressor cell.

An interfered cell is a cell influenced by the interference from interfering cell. The interfered cells may be called a victim cell.

Frequency domain ICIC coordinates the use of frequency domain resources (e.g., RB) among multiple cells.

Time domain ICIC coordinates time domain resources (e.g., subframes) among multiple cells. For time domain ICIC, Operations, Administration and Maintenance (OAM) setting, which is called Almost Blank Subframe (ABS) pattern, can be used.

The ABS at the interfering cell is used to protect the resource at the subframe at the interfered cell receiving strong inter-cell interference. ABS is manipulated at the interfering cell, and the interfered cell coordinates the interference from the interfering cell by utilizing the ABS in scheduling. ABS is a subframe having reduced transmission power (or zero transmission power) or reduced activity in physical channel.

The pattern based on the ABS is known to the UE, and measurement of the UE is restricted, which is called measurement resource restriction. The ABS pattern refers to the information indicating what subframe is the ABS in one or more radio frames.

There are 3 types of measurement resource restriction patterns depending on the measured cell (e.g., a serving cell or a neighbor cell) and measuring type (e.g., RRM (Radio Resource Management), RLM (Radio Link Measurement) or CSI (Channel State Information)).

'ABS pattern 1' is used in RRM/RLM measurement resource restriction of the serving cell. The information on the ABS pattern 1 can be informed from the BS to the UE at the time of configuration/modification/release of RB, or when MAC/PHY configuration is modified.

'ABS pattern 2' is used in RRM measurement support restriction of neighbor cells operating at the same frequency as that of the serving cell. Therefore, in ABS pattern 2, list of neighbor cells to be measured as well as the pattern information can be provided to the UE. ABS pattern 2 can be included in the measurement configuration on the measurement object.

'ABS pattern 3' is used in the restriction on CSI measurement of the serving cell. ABS pattern 3 can be included in the message configuring CSI report.

Two scenarios of CSG scenario and pico scenario are being considered for ICIC.

Figure 4:
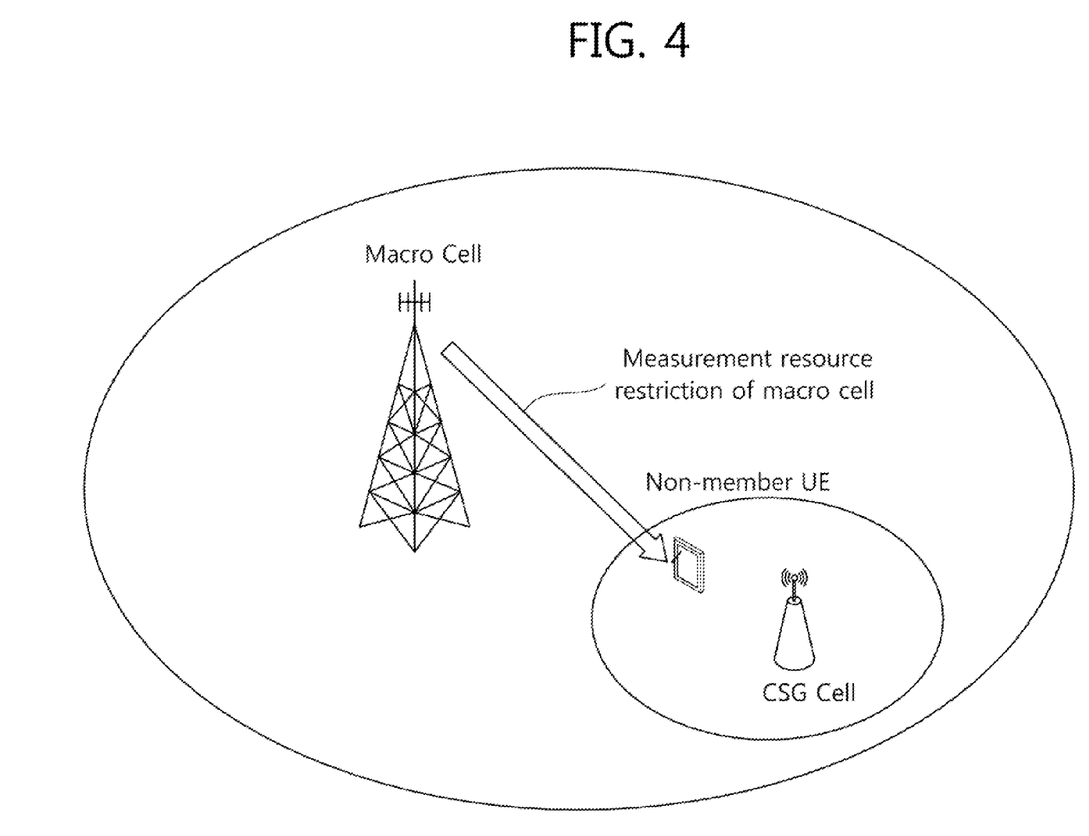
FIG. 4 illustrates a CSG scenario.

FIG. 4 illustrates a CSG scenario.

A CSG cell means a cell that only specific subscribers can access. Non-member UEs, which are not the member of the CSG cell, cannot access to the CSG cell. Macro cell means the serving cell of non-member UEs. The coverage of CSG cell and the macro cell are supposed to be overlapped partly or entirely.

Major interference condition occurs when a non-member UE is located at close proximity of a CSG cell. From the point of view of the non-member UE, the interfering cell is the CSG and the macro cell becomes the interfered cell. Time domain ICIC is used to let the non-member UE be serviced continuously in this macro cell.

In the state of RRC connection, the network, upon discovering that a non-member UE is in strong interference from the CSG, can configure measurement resource restriction.

Also, the network can configure RRM measurement resource restriction on neighboring cells for ensuring easy mobility from the macro cell. When the UE does not experience serious interference from the CSG cell any more, the network can release RRM/RLM/CSI measurement resource restriction.

The UE can use the measurement resource restriction configured for RRM, RLM and CSI measurement. In other words, resources for RLM can be used in ABS, and measurement for RLM and CSI measurement can be performed at ABS.

The network can configure so that the CSG cell does not use measurement resource restriction. In other words, the CSG cell may not transmit or receive data at ABS.

Figure 5:
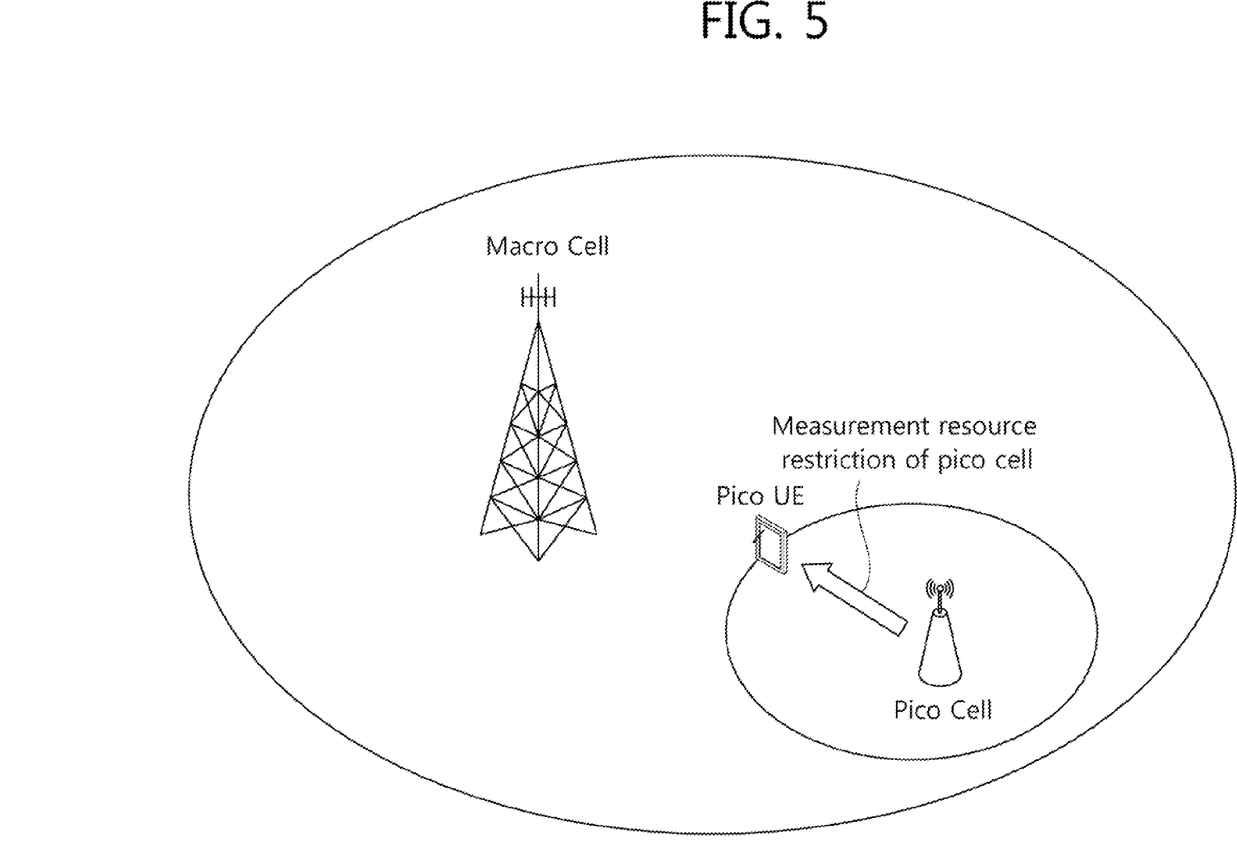
FIG. 5 illustrates a pico scenario.

FIG. 5 illustrates a pico scenario.

A pico cell is a serving cell of a pico UE. Pico cell is the cell whose coverage is overlapped with that of macro cell partly or entirely. Generally, pico cells have smaller coverage than that of macro cells, but the limitation does not always apply.

Major interference condition occurs when a pico UE is located at the edge of the pico serving cell. From the point of view of the pico UE, the interfering cell is the macro cell and the pico cell becomes the interfered cell. Time domain ICIC is used to let the pico UE be serviced continuously in this pico cell.

The pico cell, upon discovering that a pico UE is in strong interference from the macro cell, can configure measurement resource restriction to the corresponding UE.

The pico UE can use the measurement resource restriction configured for RRM, RLM and CSI measurement. In other words, resources for RLM can be used in ABS, and measurement for RLM and CSI measurement can be performed at ABS. When the pico cell is experiencing strong interference from the macro cell, more exact measurement is possible by performing RRM/RLM/CSI measurement at ABS.

Also, by letting the UE having a macro cell as a serving cell perform neighbor cell measurement at ABS, mobility from the macro cell to the pico cell can be made more easily.

Figure 6:
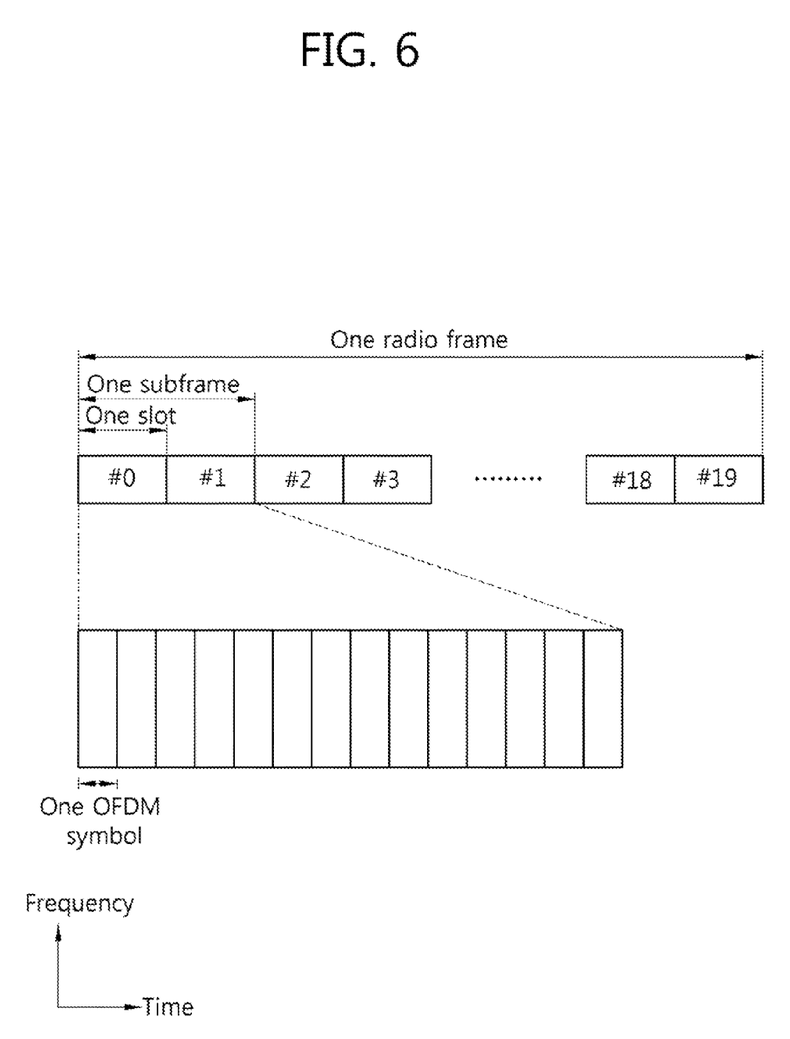
FIG. 6 illustrates the structure of downlink wireless frame in 3GPP LTE.

FIG. 6 illustrates the structure of downlink wireless frame in 3GPP LTE. For more information, reference is made to Section 6 of 3GPP TS 36.211 V8.7.0 (2009-05) "Evolved Universal Terrestrial Radio Access (E-UTRA); Physical Channels and Modulation (Release 8)".

The radio frame consists of 20 slots with indexes from 0 to 19. A subframe consists of 2 slots. The time taken to transmit one subframe is called TTI (transmission time interval). For example, the length of one subframe can be 1 ms, and the length of one slot can be 0.5 ms.

One slot can include multiple OFDM (orthogonal frequency division multiplexing) symbols in time domain. OFDM symbol is for representing the symbol period in time domain since 3GPP LTE uses OFDMA (orthogonal frequency division multiple access) at downlink (DL), and are not meant to limit multiple access methods or names. For example, OFDM symbol can be referred to as other names such as SC-FDMA (single carrier-frequency division multiple access) symbol or symbol period.

Although it is described for illustration that one slot includes 7 OFDM symbols, the number of OFDM symbols included in the slot can be changed depending on the length of CP (Cyclic Prefix). According to 3GPP TS 36.211 V8.7.0, one slot includes 7 OFDM symbols in normal CP, and one slot includes 6 OFDM symbols in extended CP.

Resource block (RB) is a unit of allocated resources and include multiple subcarriers in one slot. For example, if one slot includes 7 OFDM symbols in time domain, and a resource block includes 12 subcarriers in frequency domain, a resource block can include 7×12 resource elements (REs).

In ICIC, objects causing interference (i.e., interfering cell) and objects inflicted by interference (i.e., interfered cell) are determined depending on the objects on which the UE performs measurement.

In first case, the UE performs measuring the serving cell. Intra-frequency neighbor cell with strong signal near the UE acts as interference on the serving cell measurement. The UE can experience strong interference by neighbor cells in measuring the serving cell.

In second case, the UE performs measuring intra-frequency neighbor cells. Signal of the signal serving cell and other intra-frequency neighbor cells acts as interference on the measurement on the intra-frequency neighbor cells. The UE can experience strong interference by the serving cell and other neighbor cells in measuring the neighbor cells.

In third case, the UE performs measuring inter-frequency neighbor cells. Signal of other neighbor cells of corresponding frequency acts as interference on the measurement. The UE can experience strong interference by other neighbor cells of corresponding frequency in measuring the neighbor cells.

In many networks, depending on manipulating networks, downlink transmissions between the serving cell and neighbor cells are not exactly synchronized in time domain. However, in order for the serving cell to apply ICIC mechanism considering the interference which neighbor cells affect to the UE, it is necessary to know exactly the difference between the downlink timing of neighbor cells and the downlink timing of the serving cell.

The embodiments proposed in the specification relate to a method by which a UE measures downlink timing offset between two cells and report the result, and apply to ICIC.

Figure 7:
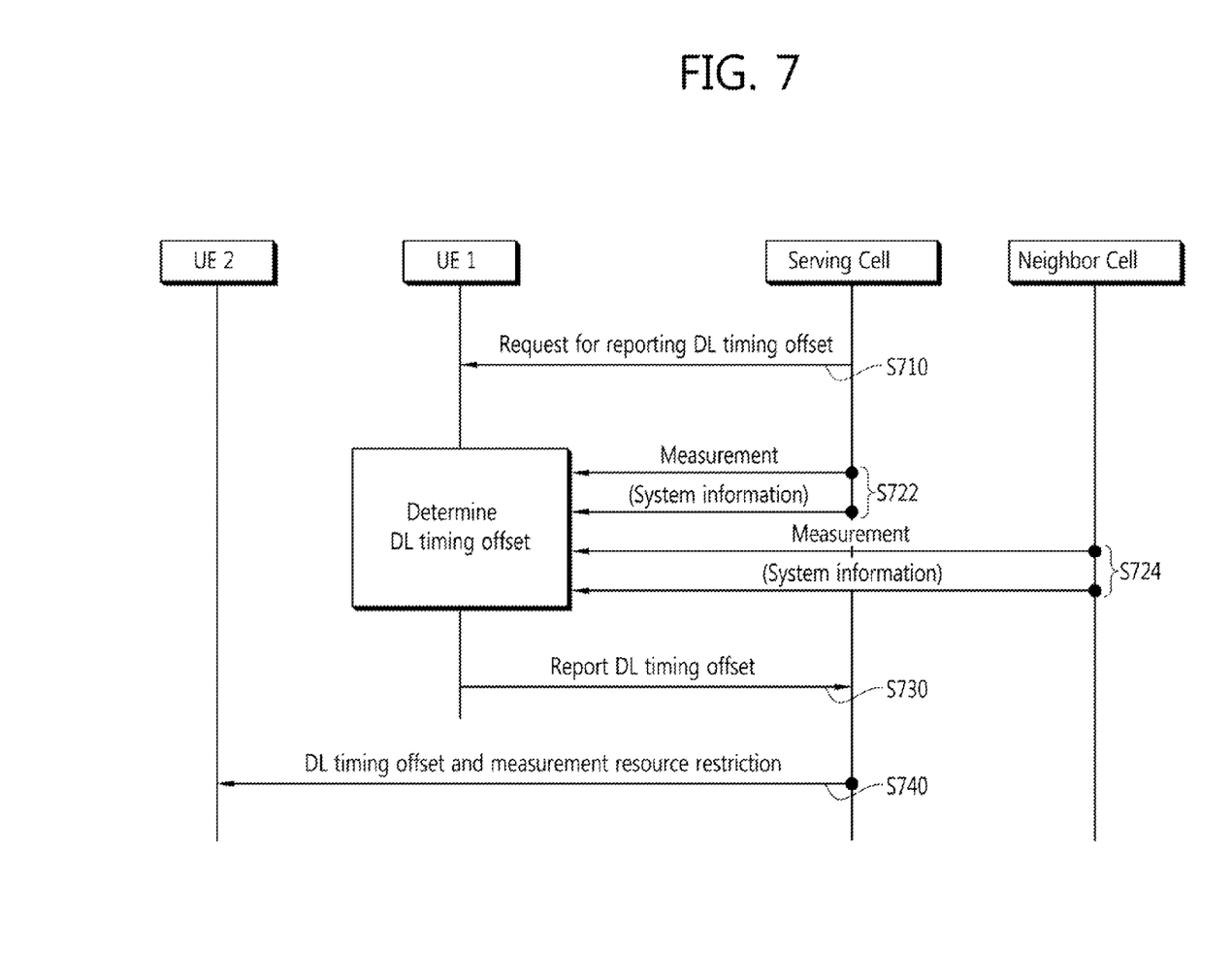
FIG. 7 is a flow diagram illustrating the inter-cell interference coordination method according to one embodiment of the present invention.

FIG. 7 is a flow diagram illustrating the inter-cell interference coordination method according to one embodiment of the present invention.

The serving cell requests the UE 1 bus to report DL (downlink) timing offset (S710).

The cells on which DL timing offset is measured include a reference cell and a target cell. The reference cell is the cell which becomes the reference for measuring timing offset, and the target cell is the cell whose offset is measured based on the timing of the reference cell. The reference cell can be a serving cell, and the target cell can be a neighbor cell. Otherwise, the reference cell can be an interfering cell, and the target cell can be an interfered cell. Or the opposite can be the case. In this description, the case where the reference cell is a serving cell and the target cell is a neighbor cell will be described for the purpose of illustration.

The report request message used for requesting the DL timing offset can include at least one of the followings:

Indicator for indicating whether DL timing offset is to be reported

Identifier of the reference cell for DL timing offset measurement

Identifier of the target cell which is the object of DL timing offset measurement Type indicator for indicating, by the UE, the type of DL timing offset Maximum time that can be used by the UE for DL timing offset measurement Condition that the UE starts measuring of DL timing offset. For example, the UE can start measuring of DL timing offset when report request is received. Or, the condition for triggering DL timing offset measurement can be included in the report request message.

The type of DL timing offset is the type used to measure or report DL timing offset, and can be one of the followings or combination thereof:

OFDM symbol offset

Subframe offset

SFN (System Frame Number) offset

Time offset. For example, in the unit of micro second.

The network can request measurement of DL timing offset on multiple reference cells.

The report request message used to request the DL timing offset can be transferred through RRC message. The report request message can be included in the measurement configuration message as one or more measurement object. Or, the report request message can be included in the measurement configuration message as one or more measurement report configurations.

The UE 1 determines DL timing offset (S720). When the triggering condition included in the report request is fulfilled or report request is received, the UE 1 starts measurement for determining DL timing offset.

Report request message can explicitly include the reference cell measuring DL timing offset and the target cell.

When the report request message does not include information on the reference cell, the UE 1 can determine the reference cell as follows.

In one example, the UE 1 can consider the first serving cell as the reference cell.

In another example, if the report request message includes information on the target cell, the UE 1 can consider the serving cell on the frequency of the target cell as the reference cell.

When the report request message does not include information on the target cell, the UE 1 can determine the target cell as follows.

In one example, the UE 1 can consider the cell affecting the strongest interference to the frequency of the reference cell as the target cell.

In another example, if the reference cell is set as the first serving cell, the target cell can be the second serving cell. Otherwise, if the reference cell is set as the second serving cell, the target cell can be the first serving cell.

When the reference cell and the target cell are determined, the UE 1 determines DL timing offset between the reference cell and the target cell. The UE 1 can measure the signal of the serving cell (reference cell) and receive system information (S722). The UE 1 can measure the signal of neighbor cells (target cells) and receive system information (S724). The system information of the neighbor cell can be used in acquiring the identifier of the neighbor cell.

Figure 8:
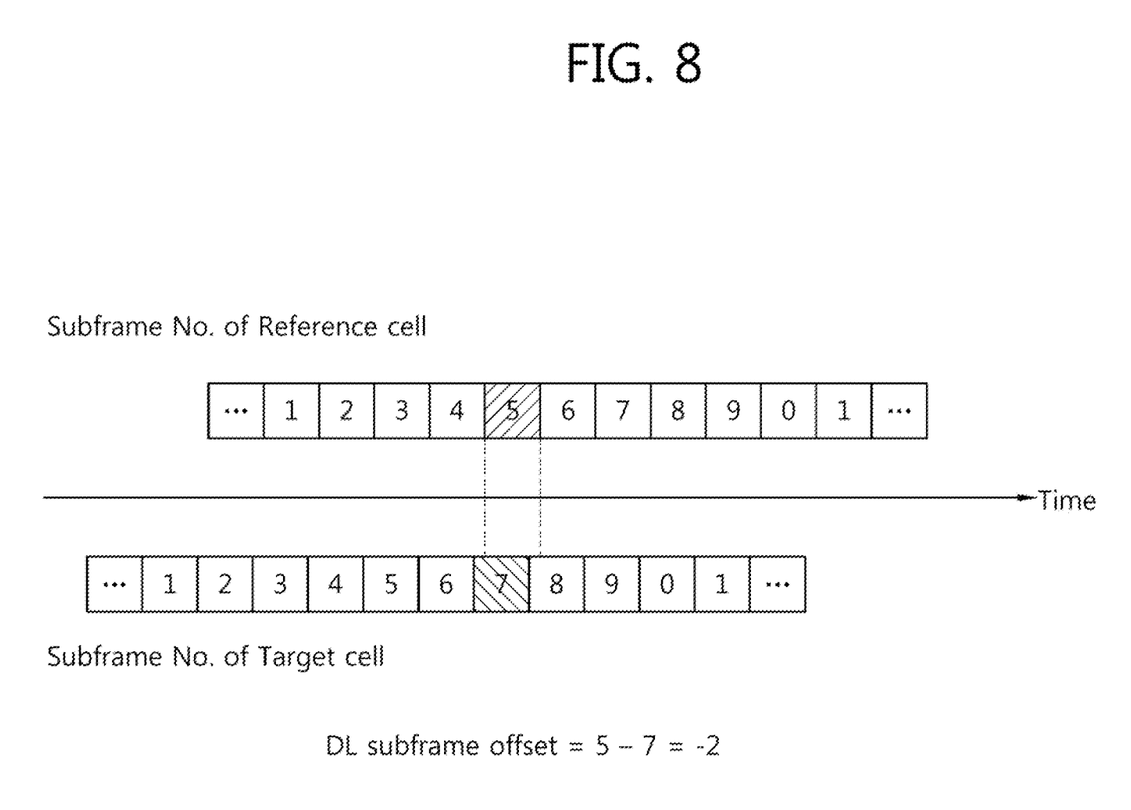
FIG. 8 illustrates one example of measuring the DL timing offset.

FIG. 8 illustrates one example of measuring the DL timing offset. The example illustrates the measurement of DL timing offset with reference to the subframe number of the reference cell and the target cell.

The UE 1 determines the subframe of the target cell as the one which is mostly overlapped with a specific subframe of the reference cell from the subframes of the target cell. For example, the subframe 5 having number 5 in the reference cell and the subframe 7 having number 7 in the target cell are mostly overlapped.

The UE 1 reports the difference in the numbers 5 of the subframe of the reference cell and 7 of the subframe of the target cell as the DL timing offset.

The UE 1 may need to read system information of neighbor cells to determine DL timing offset. For example, if SFN is used for DL timing offset measurement, the UE 1 can receive system information of neighbor cells.

Figure 9:
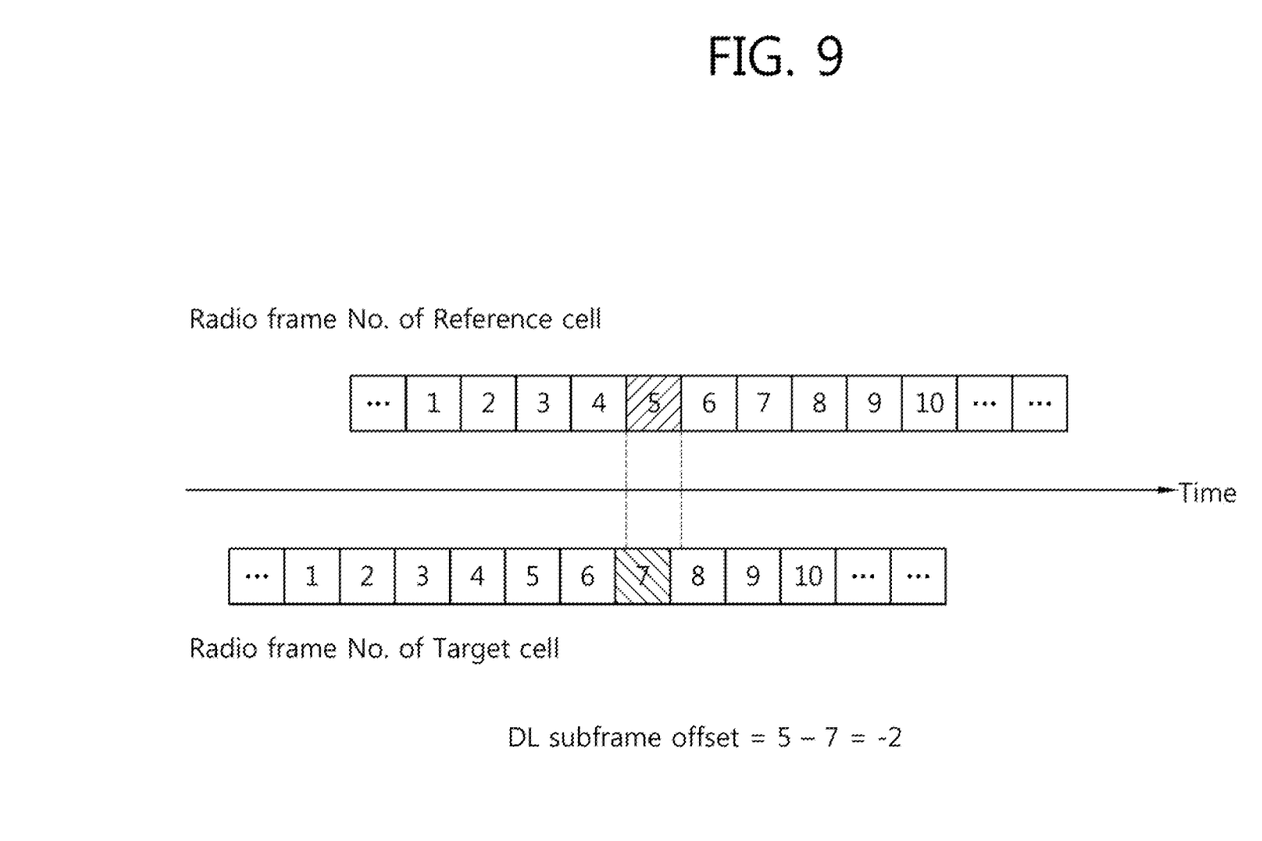
FIG. 9 illustrates another example of measuring the DL timing offset.

FIG. 9 illustrates another example of measuring the DL timing offset. The example illustrates the measurement of DL timing offset with reference to the radio frame number of the reference cell and the target cell.

The UE 1 determines the radio frame of the target cell as the one which is mostly overlapped with a specific radio frame of the reference cell from the radio frames of the target cell. For example, the radio frame 5 having number 5 in the reference cell and the radio frame 7 having number 7 in the target cell are mostly overlapped. The UE 1 reports the difference in the numbers 5 of the radio frame of the reference cell and 7 of the radio frame of the target cell as the DL timing offset.

When the report request message includes type indicator indicating the DL timing offset type, the UE can try measurement of the indicated DL timing offset type. When the report request message does not include type indicator indicating the DL timing offset type, the UE 1 can try measurement of predetermined DL timing offset type.

When the report request message includes the condition under which the UE starts measuring DL timing offset, the UE 1 can start measuring of DL timing offset when the condition is satisfied.

Referring to FIG. 7 again, the UE 1 transmits report message including DL timing offset to the serving cell (S730).

The report message can include at least one of the followings:

The value of DL timing offset
Identifier of a reference cell
Measured value of the reference cell. For example, RSRP (Reference Signal Received Power), RSRQ (Reference Signal Received Quality)
Identifier of a target cell
Measured value of the target cell. For example, RSRP, RSRQ
Location information of the UE 1
Report of reason describing the reason why the UE cannot acquire DL timing offset. For example, problems in identifying the reference cell and/or the target, insufficient measuring time.

The report message can be included in the measurement report message.

The serving cell transmits the DL timing offset received and the configuration message setting the measurement resource restriction to the UE 2 (S740). The UE 1 and the UE 2 can be identical. The UE 2 can perform RRM/RLM/CSI measurement by using the radio resource indicated at the measurement resource restriction through the application of the DL timing offset.

The serving cell can know DL timing offset between two cells which is measured from the point of view of a specific UE. The serving cell can utilize this information to improve service quality of the UE. For example, the serving cell can set the measurement resource restriction to be used for time domain ICIC by referring to the subframe offset of neighbor cells inflicting serious interference to the UE. For example, the DL timing offset can be used by the UE or BS for setting the reference point for ABS.

Therefore, the UE can be provided a service through radio resources in which interference is substantially avoided, thereby improving connectivity with the network.

The UE, even when report request of DL timing offset is not received from the serving cell, can report the DL timing offset between the serving cell and a specific neighbor cell to the serving cell on its own. For example, the UE, upon recognizing strong interference from the interfering cell, can measure the DL timing offset between the interfering cell and the interfered cell and report the result to the serving cell.

The method proposed by the present invention can be used in various schemes as well as in ICIC. For example, the method can be used to identify the difference between DL timings of multiple serving cells, and to maintain synchronization of each serving cell.

Figure 10:
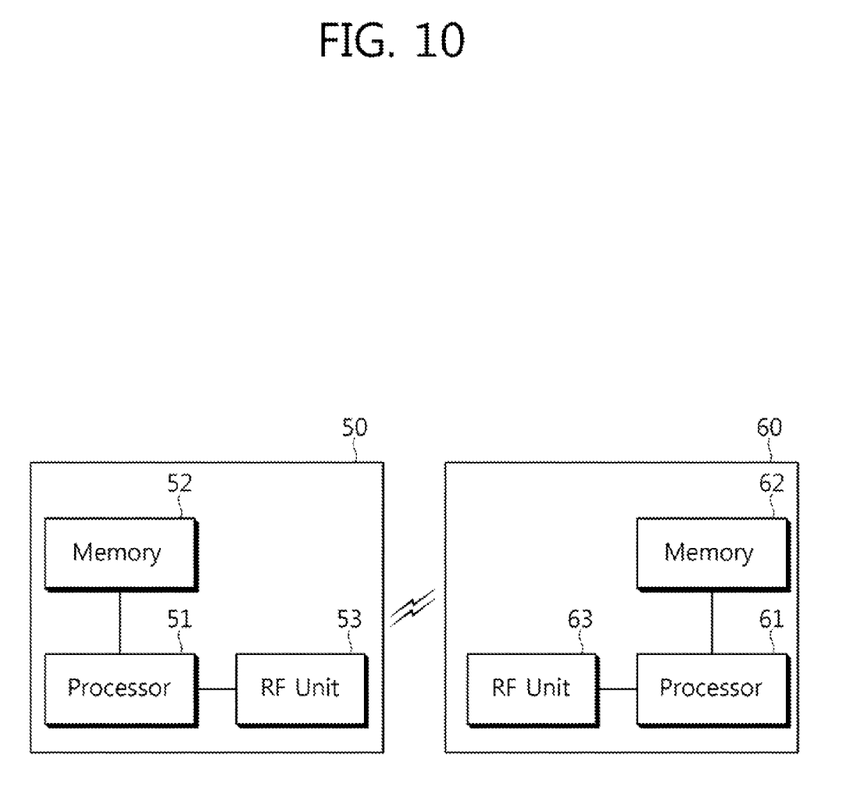
FIG. 10 is a block diagram illustrating the wireless communication system in which one embodiment of the present invention is implemented.

FIG. 10 is a block diagram illustrating the wireless communication system in which one embodiment of the present invention is implemented.

ABS 50 includes a processor 51, a memory 52 and an RF (radio frequency) unit 53. The memory 52 is connected to the processor 51, and stores various information for driving the processor 51. The RF unit 53 is connected to the processor 51, and transmits and/or receives radio signals. The processor 51 implements proposed functions, processes and/or methods. In the embodiment of FIG. 7, the operation of the BS 50 can be implemented by the processor 51.

A UE 60 includes a processor 61, a memory 62 and an RF unit 63. The memory 62 is connected to the processor 61, and stores various information for driving the processor 61. The RF unit 63 is connected to the processor 61, and transmits and/or receives radio signals. The processor 61 implements proposed functions, processes and/or methods. In the embodiment of FIG. 7, the operation of the UE 60 can be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for coordinating inter-cell interference in a wireless communication system, the method comprising:
   receiving, by a user equipment, information on a downlink timing offset between an interfering cell and an interfered cell and a measurement resource restriction from a serving cell; and
   performing, by the user equipment, a measurement by using a radio resource indicated by the measurement resource restriction by applying the downlink timing offset,
   wherein the radio resource indicated by the measurement resource restriction includes at least one almost blank subframe (ABS) that includes a subframe having a reduced transmission power or zero transmission power on a physical channel due to the interfering cell.

2. The method of claim 1, further comprising:
   determining, by the user equipment, a reference point of the at least one ABS based on the downlink timing offset.

3. The method of claim 1, wherein the serving cell includes a macro cell, and the interfering cell includes a closed subscriber group (CSG) cell, and
   wherein the user equipment is not a member of the interfering cell.

4. The method of claim 1, wherein the serving cell includes a pico cell, and the interfering cell includes a macro cell whose coverage is overlapped partly or entirely with the pico cell.

5. A user equipment configured for coordinating inter-cell interference in a wireless communication system, the user equipment comprising:
   a radio frequency (RF) unit configured to transmit radio signals; and
   a processor operably connected to the RF unit and configured to:
      receive information on a downlink timing offset between an interfering cell and an interfered cell and a measurement resource restriction from a serving cell; and
      perform a measurement by using a radio resource indicated by the measurement resource restriction by applying the downlink timing offset,
      wherein the radio resource indicated by the measurement resource restriction includes at least one almost blank subframe (ABS) that includes a subframe having a reduced transmission power or zero transmission power on a physical channel due to the interfering cell.

6. The user equipment of claim 5, wherein the processor is configured to determine a reference point of the at least one ABS based on the downlink timing offset.

7. The user equipment of claim 5, wherein the serving cell includes a macro cell, and the interfering cell includes a closed subscriber group (CSG) cell, and
   wherein the user equipment is not a member of the interfering cell.

8. The user equipment of claim 5, wherein the serving cell includes a pico cell, and the interfering cell includes a macro cell whose coverage is overlapped partly or entirely with the pico cell.

9. A method for reporting a downlink timing in a wireless communication system, the method comprising:
   receiving, by the equipment, a request for reporting the downlink tuning offset from the serving cell;
   determining, by a user equipment, the downlink timing offset between an interfering cell and an interfered cell from a serving cell; and
   reporting, by the user equipment, said downlink timing offset to the serving cell.

10. The method of claim 9, further comprising:
    receiving, by the user equipment, information on a measurement resource restriction from the serving cell; and
    performing, by the user equipment, a measurement by using a radio resource indicated by the measurement resource restriction by applying the downlink timing offset.

11. The method of claim 10, wherein the radio resource indicated by the measurement resource restriction includes at least one almost blank subframe (ABS) that includes a subframe having a reduced transmission power or zero transmission power on a physical channel due to the interfering cell.

* * * * *